United States Patent [19]

De Voogd

[11] 4,273,205
[45] Jun. 16, 1981

[54] CLAMPING DEVICE FOR OSCILLATORY STRINGS IN A WEIGHT SENSING CELL FOR A WEIGHING APPARATUS

[75] Inventor: Albert H. De Voogd, Venlo, Netherlands

[73] Assignee: Maatschappij van Berkel's Patent N.V., Leidschendam, Netherlands

[21] Appl. No.: 125,490

[22] Filed: Feb. 28, 1980

[30] Foreign Application Priority Data

Mar. 2, 1979 [DE] Fed. Rep. of Germany ....... 2908110

[51] Int. Cl.³ .......................... G01G 3/14; G10D 3/00
[52] U.S. Cl. .............................. 177/210 FP; 177/264; 84/297 R
[58] Field of Search ................. 177/210 FP, 225, 264; 84/297 R

[56] References Cited

U.S. PATENT DOCUMENTS

4,121,677 10/1978 Macari et al. ........................ 177/225

FOREIGN PATENT DOCUMENTS

2340969 2/1975 Fed. Rep. of Germany .... 177/210 FP

Primary Examiner—George H. Miller, Jr.
Attorney, Agent, or Firm—Lloyd L. Zickert

[57] ABSTRACT

A clamping device for oscillatory or vibratory strings including a massive clamping head gripping one end of a string and secured to the frame or load receiving member by a flexurally and/or torsionally resilient neck which extends into the clamping head such that the clamping point of the string substantially aligns with the connecting area between the neck and the clamping head.

7 Claims, 5 Drawing Figures

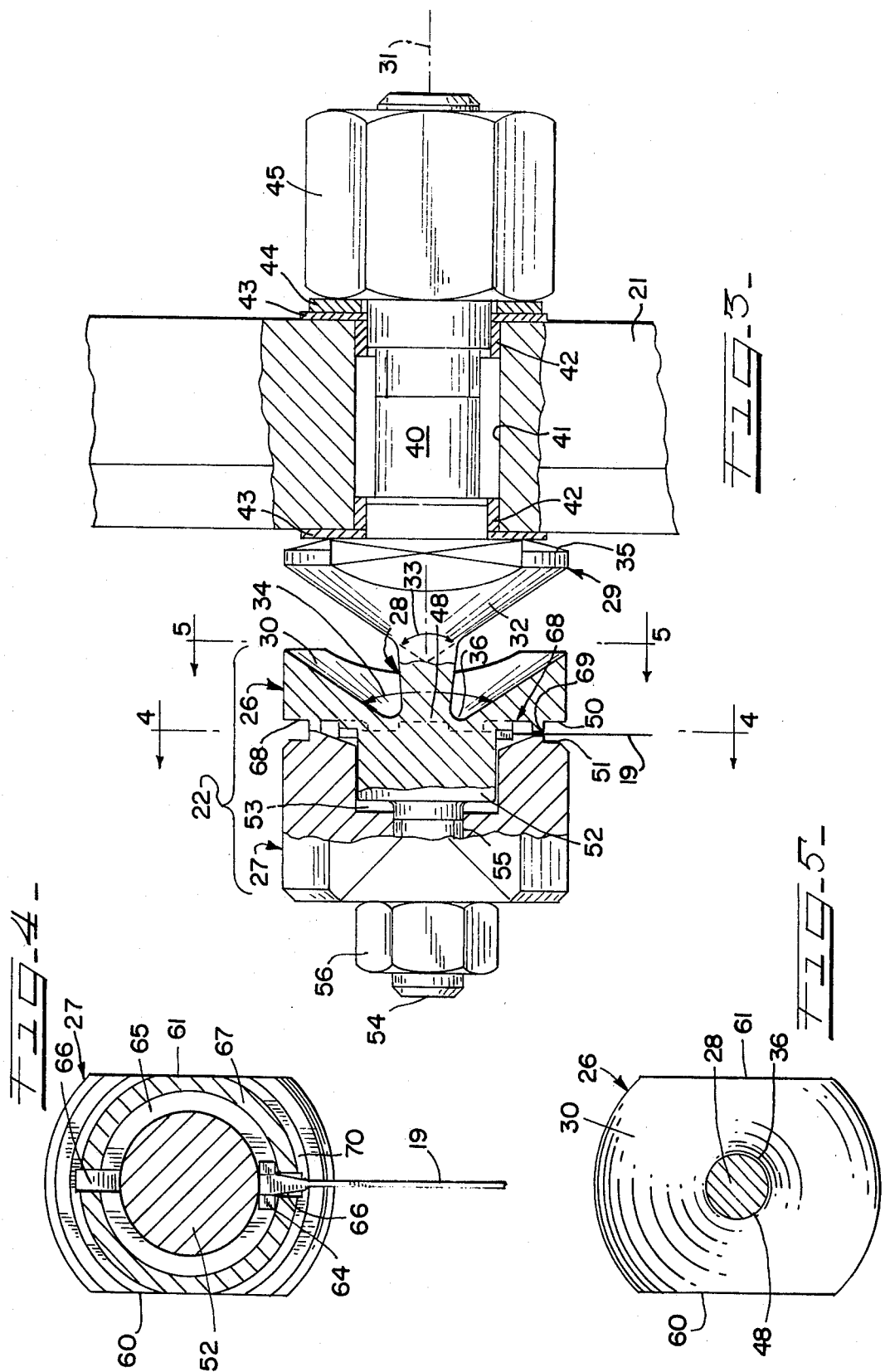

CLAMPING DEVICE FOR OSCILLATORY STRINGS IN A WEIGHT SENSING CELL FOR A WEIGHING APPARATUS

This invention relates in general to weighing apparatus, and more particularly to weighing apparatus having weight sensing cells with oscillatory or vibratory strings, and still more particularly to a clamping device for securing the ends of the string to the frame or weight receiving member of the weighing apparatus.

Weighing apparatus having weight sensing cells with vibratory or oscillatory strings are well known. It is also known that the oscillations or vibrations of such a string are related to the dimensions of the string, the tension forces acting upon it, and the manner in which the string is connected to the frame and/or weight receiving member. While a weighing apparatus usually includes a pair of weight sensing cells, one of which is subjected to a reference weight and the other of which is subjected to the weight of the object being weighed by the apparatus, it is important in each cell to minimize, if not completely eliminate, the transmittal of vibrations or oscillations to the strings which detrimentally affect the accuracy of the weight measurements, and in this regard those vibrations or oscillations having nothing to do with the weighing function should be shielded or insulated from the vibrating strings. Particularly, it is important to avoid the transmittal of vibrations in the frequency range of the vibrating strings which relate to weight measurement frequencies. Thus, it may be appreciated that parts of the apparatus oscillating or vibrating in harmony with the vibrations of the strings affect the amplitude of string vibration which interferes with its frequency and thereby interferes with the accuracies of weight measurements to an unsatisfactory extent. In this regard, any vibrations of the clamping device itself would affect the vibratory function of the strings. Devices for reducing the transmission of vibratory energy in the desired frequency range have been known, such as those disclosed in West German Pat. No. 2,239,997. However, such devices have the above objections.

Heretofore, any attempt to solve this problem involved clamping devices complex in nature and of such a size that they increase the overall size of the weighing apparatus to an unsatisfactory degree.

The clamping device of the present invention overcomes the problems heretofore encountered in providing a device which functions as a low pass filter which substantially eliminates any undesirable vibrations being transmitted to the vibrating strings. Accordingly, the present invention provides a clamping device having a clamping head with a recess having connected to the bottom thereof a connecting neck that is in turn connected to a base and the frame or weight receiving member of the apparatus. The string clamping point on the head is accordingly positioned toward the neck and substantially in alignment with the connecting point between the neck and the clamping head.

In the design of a clamping device having a neck portion, a long neck softens the springing action in the clamping head which will produce a filtering effect for low frequency vibrations, but such is objectionable inasmuch as the overall dimension and space required for such a device is undesirable, and the oscillation amplitude of the clamping head as supported by the neck is greater than desired. On the other hand, smaller clamping head dimensions, while saving space, are not capable of satisfactory filtration of low frequency vibrations.

Accordingly, the clamping device of the present invention which utilizes a recess for the clamping head overcomes the problems of design above enumerated by permitting a neck of a sufficient length without increasing the space required to connect thereto a massive clamping head. Moreover, the mass of the clamping head can be essentially aligned with the area of the neck connecting into the recess, thereby positioning the mass center of the head closer to the neck or even within the length of the neck itself. Further, the clamping point of the string is moved closer to the center of gravity of the device and preferably vertically aligned with it. Thus, the clamping point of the string is in the area of the neck and optimally being near the center of the length of the neck. Accordingly, this invention substantially eliminates undesirable vibratory conditions from the function of the string, thereby enabling the string to produce more accurate weight measurement signals.

Preferably, the clamping device of the present invention is structured so that the recess formed in the clamping head is conical in shape and axially extending with respect to the neck. Accordingly, the mass elements of the head closest to the point of mounting to the apparatus are at the greatest radial distance from the axis of the neck. It is also advantageous to provide a base for the clamping device at the end of the neck next to the part of the apparatus to which it is connected, which base widens and is conically shaped so that more desirable vibratory conditions are obtained. It is also advantageous in order to minimize transmission of undesirable vibrations to have the apex angle of the conical base be substantially the same as the angle of aperture of the conical recess. The clamping head includes coacting jaws which can be secured together for gripping the end of the string. To enhance the distribution of mass between the jaws and the assembly of the jaws, a centrally located projection on the jaw closest to the neck extends into a mating recess on the other jaw when the jaws are in assembled relation.

It is therefore an object of the present invention to provide a new and improved clamping device for gripping and mounting vibratory strings in weight sensing cells of weighing apparatus.

It is a further object of the present invention to provide a clamping device for vibratory strings having a flexurally and/or torsionally resilient neck connected between the base and the clamping head which serves to provide a low frequency filter, thereby insulating undesirable frequencies in the frame and/or weight receiving member of the apparatus from the vibratory strings to enhance more accurate measurements.

Another object of this invention is in the provision of a clamping device for vibratory strings in a weight sensing cell which includes a massive clamping head having a recessed end into which is connected at its bottom a neck portion and which is in turn connected to a base that is so structured relative to the clamping head that the entire device essentially eliminates the transmission of undesirable frequencies from the frame or weight receiving member to the vibratory string.

Other objects, features and advantages of the invention will be apparent from the following detailed disclosure, taken in conjunction with the accompanying sheets of drawings, wherein like reference numerals refer to like parts, in which:

FIG. 3 is a greatly enlarged axial sectional view taken through the clamping device of the present invention and a part of the frame to which it is mounted;

FIG. 4 is a vertical sectional view taken substantially along line 4—4 of FIG. 3; and FIG. 5 is a vertical sectional view taken substantially along line 5—5 of FIG. 3 and showing the recessed end of the clamping head.

Figure 1:
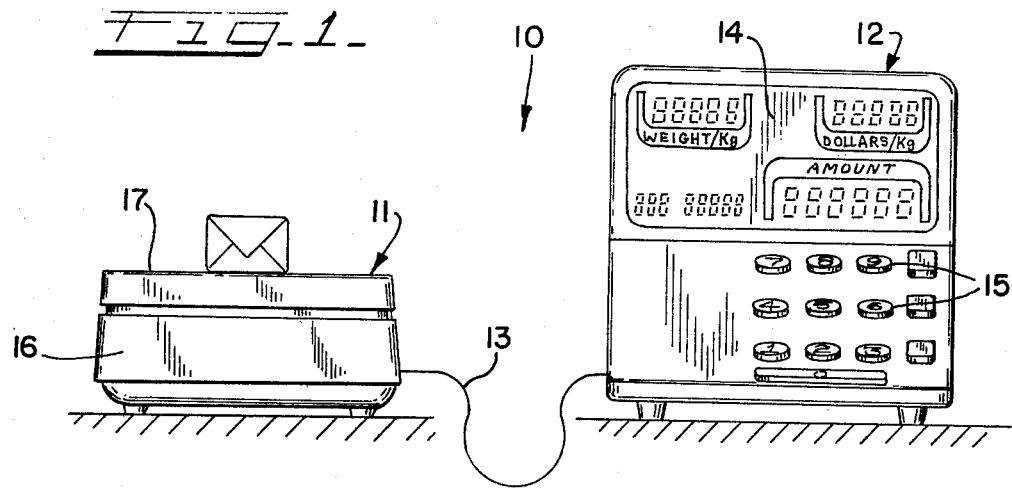
FIG. 1 is an elevational view of a weighing apparatus incorporating a clamping device according to the present invention.
Figure 2:
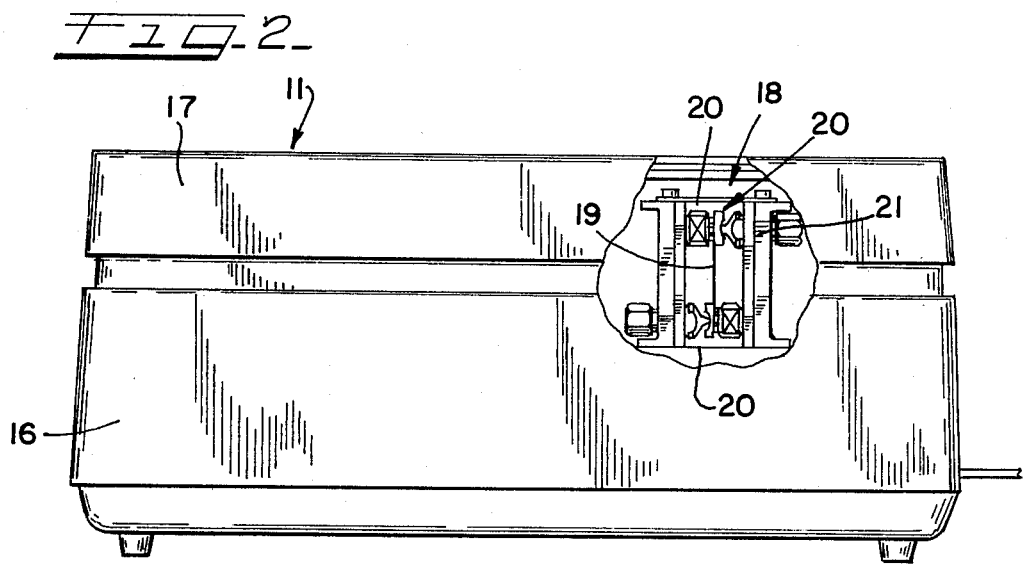
FIG. 2 is an enlarged elevational view with some parts broken away to show underlying parts of the weighing unit and showing clamping devices according to the present invention.

Referring now to the drawings and particularly to FIGS. 1 and 2, the clamping device of the invention is particularly useful in a weighing system 10 which includes a weighing device or apparatus 11 for determining the weight of objects and an evaluation device or unit 12 which is connected to the weighing device by means of a cable 13. The evaluating device 12 includes a display 14 for digitally displaying weight and price data as well as any other information desired to be conveyed to the user, together with a keyboard 15 for entering price data or other information into the unit such as the price-per-unit weight of a particular product being weighed.

The weighing device 11 includes a housing 16 within which a weight measuring movement is located and a load pan or platform 17 onto which the object to be weighed is placed and which is suitably connected by a system of levers to a weight measuring movement that would normally include two weight sensing or measuring cells, one of which is generally illustrated in FIG. 2 at 18. The weight sensing cell 18 includes a vibratory or oscillatory string 19 which in the cell illustrated functions to provide a weight measuring signal in the usual manner and is fixed at one end by being connected at one end to the frame and movable at the other end by being connected to the lever system connecting to the load pan 17. The opposite ends of the string 19 are connected to respective members of the weighing device by clamping devices 20, one of which would be in this cell connected to the load pan 17, and the other of which would be connected to the lever system connecting in turn to the load platform 17. It may be appreciated that when a load is placed on the load pan 17, the weight is transferred through the pan to the system of levers and to one of the clamping devices and in this instance to the lower clamping device 20 so that the effective force on the lower clamping device acts on the string 19 and exerts a force on it with respect to the upper clamping device 20. As is well known, the string would be caused to oscillate or vibrate an electrical means and the vibrations or oscillations are modified by the force acting on the string, whereby the vibrations of the string are sensed and will produce a measure of the weight of the load which would be received by the evaluating device 12 and read out in the display 14 after appropriate calculations have been made. It will be appreciated that the upper clamping device 20 is fixed and mounted on the frame 21 of the apparatus, while the lower clamping device 20 is mounted on a support which is movable in relation to movement of the load pan 17. Further, both clamping devices 20 are of the same type and constitute the present invention as they serve to mount in tensioned form the vibrating string 19.

For purposes of describing the clamping device 20 of the invention, it is shown in enlarged detail in FIGS. 3, 4 and 5 and in FIG. 3 is illustrated as being mounted on the frame 21, but it should be appreciated that it could be mounted on any part of the apparatus as desired. The clamping device 20 includes a clamping head 22 having inner and outer jaws 26 and 27 coacting to grip one end of the vibrating string 19, a neck 28 and a base 29. The clamping head 22 includes a recess 30 at the end facing the neck 28 and into which the neck is received and attached thereto at the bottom 36 of the recess. The recess is conical in shape about the longitudinal axis 31 of the clamping device. More particularly, the recess 30 is formed on the inner clamping jaw 26. The base 29 is also conically formed with a conical surface 32 having an apex angle 33 that is substantially identical to the aperture angle 34 of the recess 30. The apex angle 33 and the aperture angle 34 are bisected by the axis 31.

The base 29 further includes a frustoconical section 35, the face of which opposes the support on which the clamping device is mounted and, in this case, the frame 21 in the illustrated embodiment. The clamping device is mounted to the frame by means of a bolt portion 40 which extends through a hole 41 formed in the support 21. The clamping device is insulated from the support 21 by means of insulating sleeves 42 and insulating washers 43. Additionally, a washer 44 abuts against the outside washer 43 and against which a nut 45 bears, which is threadedly received on the free end of the bolt 40 to fasten the clamping device to the support 21.

As illustrated particularly in FIG. 3, wherein the conical recess 30 forms a surface that substantially parallels the conical base 29, that is the surface 32 of the conical base 29, the free end of the neck 28 which would be the end away from the base 29 connects to the clamping head at the bottom of the recess 30 at 48. This may be considered to be the contact area. The neck 28 is tapered from the base 29 to the clamping head 22 to a slight extent.

The clamping head jaws 26 and 27 have respectively profiled flange surfaces 50 and 51 facing each other. The inner clamping block 26 includes a central hub or projection 52 which is received in a cylindrical recess 53 formed in the outer jaw 27. Extending from the free end of the central hub 52 is a threaded shank 54 which extends through an axial hole or bore 55 formed in the outer jaw 27. In order to lock the outer jaw 27 against the inner jaw 26, a nut 56 is threaded onto the shank 54 and drawn against the outer end surface of the outer jaw 27.

As noted particularly in FIGS. 4 and 5, the cross-sectional shape of the clamping jaws 26 and 27 is generally cylindrical with opposed flatted surfaces 60 and 61. Thus, the cross-sectional shape of the jaws is only rounded in the direction of the string that is gripped between them, and the flatted surfaces 60 and 61 are parallel to the direction of the string which is significant to the vibratory function of the string.

The end of the string 19 which is gripped by the clamping head jaws 26 and 27 has suitably secured thereto or otherwise formed a hammerhead shaped block 64 or T-shaped block which has the cross arm received in an annular groove 65 formed in the flange surface 51 of the outer clamping head jaw 27. The leg portion of the T-shaped end 64 extends through a radial slot 66 formed in an annular ridge or projection 67. Opposing the T-shaped end 64 on the inner jaw 26 an annular projection or ridge 68 serves to maintain the T-shaped end in position on the clamping jaw 27. Also, the annular ridge or projection 67 fits in a mating annular groove 68 formed in the inner jaw 26. Radially outward of the annular groove 68 is an annular rib or projection 69 which abuts against an annular mating rib or projection 70 formed on the outer jaw 27. It should be appreciated that the radially extending slots 66 formed in the outer jaw are on a diameter and are axially aligned with the string and in parallel relation to the flatted sides 60 and 61. Thus, the T-shaped end 64 bears against the inner surfaces of the annular ridge 67 when it is properly mounted in the outer jaw 27. Outward of the T-shaped end 64 the string 19 is gripped between the inner and outer clamping head jaws by the annular rib 69 on the inner jaw and the corresponding annular rib 70 on the outer jaw.

The length of the neck 28 effectively overlaps with the clamping head 22, as seen particularly in FIG. 3. Because of the recess 30 in the clamping head, the mass of the clamping head is shifted toward the base 29 of the clamping device. Accordingly, the center of gravity of the clamping head is shifted closer to the neck 28. Likewise, the clamping point of the clamping head is shifted closer to or at least toward the neck 28. Thus, the clamping point is substantially aligned with the center of gravity of the clamping head. If it were desired to move the center of gravity of the clamping head and the clamping point further toward the neck, the recess in the clamping head would be made deeper.

From the foregoing, it can be appreciated that the structure of the clamping device is such as to materially reduce, if not eliminate, the transmission of undesirable vibrations from the support of the clamping head to the string.

It will be understood that modifications and variations may be effected without departing from the scope of the novel concepts of the present invention, but it is understood that this application is to be limited only by the scope of the appended claims.

The invention is hereby claimed as follows:

1. In a weight sensing cell for a weighing apparatus having a vibrating string, a clamping device mounted on a fixed or movable support of the apparatus for securing thereto an end of the string which comprises, a base adjacent to the support, a flexurally and/or torsionally resilient neck extending from the base along an axis perpendicular to the string, and a clamping head on the free end of the neck, said clamping head including jaws for clamping the end of the string and having a recess facing the neck and into which the neck extends such that the clamping point of the jaws is substantially aligned with the bottom of the recess where the neck is joined.

2. The clamping device of claim 1, wherein a central hub extends from the clamping jaw at the neck and into a mating recess in the other clamping jaw.

3. The clamping device of claim 1, wherein the recess is conical and the axis of the recess is coincident with the axis of the neck.

4. The clamping device of claim 3, wherein the base widens from the neck in the shape of a cone to define a conical surface opposite the conical recess.

5. The clamping device of claim 4, wherein the conical surface of the base is substantially parallel to the conical surface of the recess.

6. The clamping device of claim 4, wherein the angle of aperture of the recess is substantially the same as the apex angle of the base.

7. In a weight sensing cell for a weighing apparatus having a vibrating string, a clamping device mounted on a fixed or movable support of the apparatus for securing thereto an end of the string which comprises, a base adjacent to the support, said base being in the shape of a cone thereby presenting a conical surface facing away from the support, a flexurally and/or torsionally resilient neck extending from the base along an axis perpendicular to the string, and axial with the conical surface of the base, a clamping head on the free end of the neck, said clamping head including inner and outer jaws for clamping the end of the string, said inner jaws being integral with said neck and extending from same and having a conical recess facing the neck, said neck extending into and connecting at the bottom of the recess, said jaws having opposed gripping surfaces for gripping the string, a threaded shank extending axially from the inner jaw, said outer jaw having a bore therethrough for fitting onto said threaded shank, nut means for the shank to force the outer jaw against the inner jaw into gripping relation, and the string clamping point of the jaws being substantially aligned with the bottom of the recess.

* * * * *